United States Patent
Burns et al.

(10) Patent No.: US 8,541,915 B2
(45) Date of Patent: Sep. 24, 2013

(54) DRIVE MODULE AND MANIFOLD FOR ELECTRIC MOTOR DRIVE ASSEMBLY

(75) Inventors: Stephen S. Burns, Loveland, OH (US); Mickey W. Kowitz, Maineville, OH (US); Timothy J. Wieck, Cincinnati, OH (US); Donald L. Wires, Loveland, OH (US)

(73) Assignee: AMP Electric Vehicles Inc., Loveland, OH (US)

( * ) Notice: Subject to any disclaimer, the term of this patent is extended or adjusted under 35 U.S.C. 154(b) by 49 days.

(21) Appl. No.: 13/283,663

(22) Filed: Oct. 28, 2011

(65) Prior Publication Data
US 2012/0104883 A1    May 3, 2012

Related U.S. Application Data

(60) Provisional application No. 61/407,600, filed on Oct. 28, 2010.

(51) Int. Cl.
*H02K 9/19*    (2006.01)
(52) U.S. Cl.
USPC .............................................. 310/54; 310/59
(58) Field of Classification Search
USPC .............................................. 310/54, 59, 64
See application file for complete search history.

(56) References Cited

U.S. PATENT DOCUMENTS

| | | | |
|---|---|---|---|
| 3,388,559 A * | 6/1968 | Johnson | 62/224 |
| 5,345,155 A | 9/1994 | Masaki et al. | |
| 5,372,213 A * | 12/1994 | Hasebe et al. | 180/65.6 |
| 5,845,732 A | 12/1998 | Taniguchi et al. | |
| 6,499,549 B2 | 12/2002 | Mizon et al. | |
| 6,524,215 B1 | 2/2003 | Schmidt | |
| 7,112,155 B2 | 9/2006 | Keuth | |
| 7,665,560 B2 | 2/2010 | Gelinas | |
| 7,699,737 B2 | 4/2010 | Berhan | |
| 2010/0222953 A1 | 9/2010 | Tang | |
| 2011/0114399 A1 | 5/2011 | Palfai et al. | |
| 2011/0115320 A1 | 5/2011 | Palfai et al. | |
| 2011/0115321 A1 | 5/2011 | Chamberlin et al. | |

FOREIGN PATENT DOCUMENTS

| | | |
|---|---|---|
| DE | 102008061449 A1 | 6/2010 |
| WO | 2011060362 A1 | 5/2011 |

OTHER PUBLICATIONS

The International Searching Authority, The International Search Report and the Written Opinion of the International Searching Authority, or the Declaration, PCT/US2011/058018, Mar. 7, 2012, 7 pgs.

* cited by examiner

*Primary Examiner* — Tran Nguyen
*Assistant Examiner* — Naishadh Desai
(74) *Attorney, Agent, or Firm* — Wood, Herron & Evans, LLP

(57) ABSTRACT

A coolant fluid distributing manifold for a drive module in an electric motor drive assembly includes a body and passageways in the body for distributing coolant fluid to components of the drive module. The passageways define a delivery conduit and a return conduit.

15 Claims, 7 Drawing Sheets

DRIVE MODULE AND MANIFOLD FOR ELECTRIC MOTOR DRIVE ASSEMBLY

This application claims priority of U.S. Provisional Patent Application No. 61/407,600, filed Oct. 28, 2010, which is expressly incorporated herein by reference.

BACKGROUND OF THE INVENTION

This invention relates to features of an electric motor drive assembly that can be used in an existing vehicle or a new vehicle, such as a car.

Present day internal combustion engine four wheel cars are not as efficient as most electric cars because of the losses in the internal combustion engines and the mechanical drive train.

Modern all electric four wheel vehicles commonly use one or more motors and some form of mechanical transmission or mechanical differential arrangement to deliver power to the drive wheels. Such arrangements are basically conventional and are less efficient because of the losses in the mechanical transmission and mechanical differential that drive the wheels. The losses are compounded if the electric drive train is also coupled to an internal combustion engine, such as in a hybrid configuration. Generally the losses in this type of electrical drive train can be expected to be less than the total losses in an all internal combustion engine drive car with a conventional mechanical transmission and mechanical drive train.

Drive assemblies including one or more electric motors for delivering power to the drive wheels of a vehicle have been developed, with more lately-developed drive assemblies having done away with the conventional mechanical transmission or mechanical differential arrangement, or both as shown in U.S. Patent Application Publication Nos. 2011/0114399; 2011/0115321; 2011/0115320 and International Publication No. WO 2011/060362, each of which is expressly incorporated in its entirety herein. In one example, a drive assembly includes two electric motors, with the output shaft of each motor being connected to a planetary gear assembly. The planetary gear assembly is, in turn, connected to a wheel through an axle and one or more continuous velocity joints. A conventional mechanical transmission is unnecessary in such an assembly because the electric motors deliver high torque and speed and are capable of delivering appropriate amounts of torque and speed for typical driving needs. And, because the output of the electric motors drives the planetary gear assembly, which, in turn is connected to a wheel by an axle and one or more continuous velocity joints, a conventional mechanical differential is also unnecessary.

In a working environment, such as in a vehicle, the components of these types of drive assemblies can be closely situated and can generate heat when used. Maintaining suitable operating conditions, such as temperature, is an important concern for the operation and longevity of the drive assemblies. Cooling systems have been used with internal combustion engines to remove excess heat and control operating temperatures. But, because some electric motor drive assemblies for vehicles are of relatively recent design and new developments are underway, their cooling systems have not reached a mature stage.

Thus, a need exists in the art for features of an electric motor drive assembly for controlling the temperature in the drive assembly, thereby facilitating the efficiency advantages of electric vehicles.

SUMMARY OF THE INVENTION

According to an embodiment of the invention, a coolant fluid distributing manifold for a drive module in an electric motor drive assembly includes a body, and passageways in the body for distributing coolant fluid to components of the drive module. The passageways define a delivery conduit and a return conduit.

According to another embodiment of the invention, a drive module for an electric motor drive assembly includes a generally cylindrical housing, at least one motor at least partially enclosed by the housing, and a coolant fluid distributing manifold. The manifold includes a body, and a delivery conduit and a return conduit defined in the body for distributing coolant fluid to components of the drive module. The delivery conduit and the return conduit are in fluid communication with the exterior of the housing.

And according to another embodiment of the invention, an electric motor drive assembly includes a drive module having a generally cylindrical housing, at least one motor at least partially enclosed by the housing, and a coolant fluid distributing manifold. The manifold includes a body, and a delivery conduit and a return conduit defined in the body for distributing coolant fluid to components of the drive module. The delivery conduit and the return conduit are in fluid communication with the exterior of the housing.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

This invention will be described more fully hereinafter with reference to the accompanying drawings, in which some examples of the embodiment of the invention is shown. In particular, this invention is described in the context of an electric motor drive assembly of the type that is used in a vehicle in lieu of a convention internal combustion engine. While the elements of such a vehicle and electric motor drive assembly are presented herein, it will be appreciated that the invention has broad application to the electric motor drive assembly arts and could be incorporated into other environments.

Figure 1:
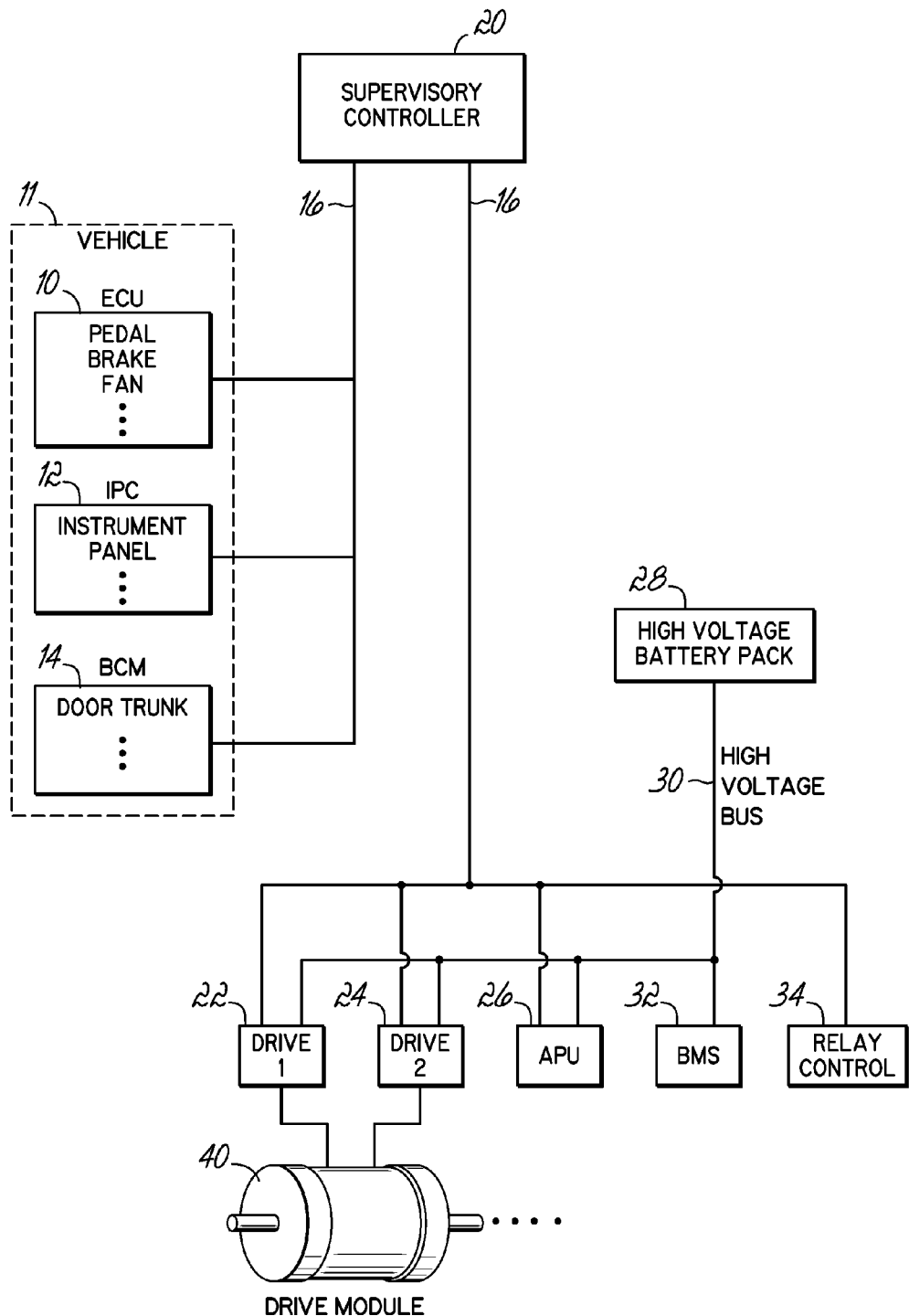
FIG. 1 is a schematic diagram showing the relationship of features of an exemplary vehicle having an electric motor drive assembly.

FIG. 1 illustrates schematically the overall architecture of an exemplary vehicle having an electric motor drive assembly in which the embodiment of this invention may be implemented. It will be appreciated that this invention is equally applicable in other vehicles having an electric motor drive assembly, and the architecture described is just one possible configuration.

The vehicle's electrical system in one embodiment is mostly represented by the Engine Control Unit (ECU) 10, the Instrument Panel Control (IPC) 12, and the Body Control Module (BCM) 14. The vehicle communicates bi-directionally over a communications network 16 with a supervisory controller 20 for such things as the instrument panel status, the accelerator pedal position, and status of the airbags, antilock brakes, and the like. The supervisory controller 20 also communicates bi-directionally with a pair of controllers 22, 24, with each controller responsible for controlling an associated drive module 40 having a pair of electric motors.

The controllers 22, 24 provide the appropriate amount of torque to the drive motors of the drive module 40 as requested from the accelerator pedal through the ECU 10 over the communications network 16 to the supervisory controller 20. The torque request is then transmitted over the communication network 16 from the supervisory controller 20 to the controllers, 22, 24, to apply the appropriate amount of torque to the drive wheels to deliver the speed desired from the driver. The supervisory controller 20 can supply varying torque requests to the drive wheels based on information such as wheel position, vehicle velocity, acceleration, and the like to effect individual wheel velocity such as during turning, or limiting wheel spin due to road conditions or rapid vehicle maneuvering.

The Auxiliary Power Unit (APU) 26 provides 12 VDC power to the vehicle systems from the High Voltage (HV) battery pack 28 by way of a high voltage bus 30. This unit converts the 356+ VDC of the main battery to 12+ VDC at greater than 150 amps if needed to run the vehicle systems. These systems include but are not limited to providing power to the controllers 22, 24, the Battery Management System (BMS) 32, and other vehicle systems such as the supervisory controller 20, the ECU 10, the BCM 14, the IPC 12, the stereo, lights, and other 12 VDC ancillary systems.

A relay control 34 provides the logic and power necessary to run the vehicle ancillary systems such as the coolant fluid pumps (not shown), sequencing the drive enable signals and pre-charge circuits, enabling the air conditioning, sensing the gear shift lever position, and the like.

The controllers 22, 24, the BMS 32, the relay controller 34, and the APU 26 communicate bi-directionally to the supervisory controller 20 to maintain proper operation of the vehicle. This communication includes signals to initiate events such as starting the vehicle, putting the vehicle in park, monitoring health and status of the various control functions such as individual motor temperature, motor current, motor speed battery voltage and current, State Of Charge (SOC) of the battery pack and the like as well as fault codes from the various control devices on the communications network 16.

Figure 2:
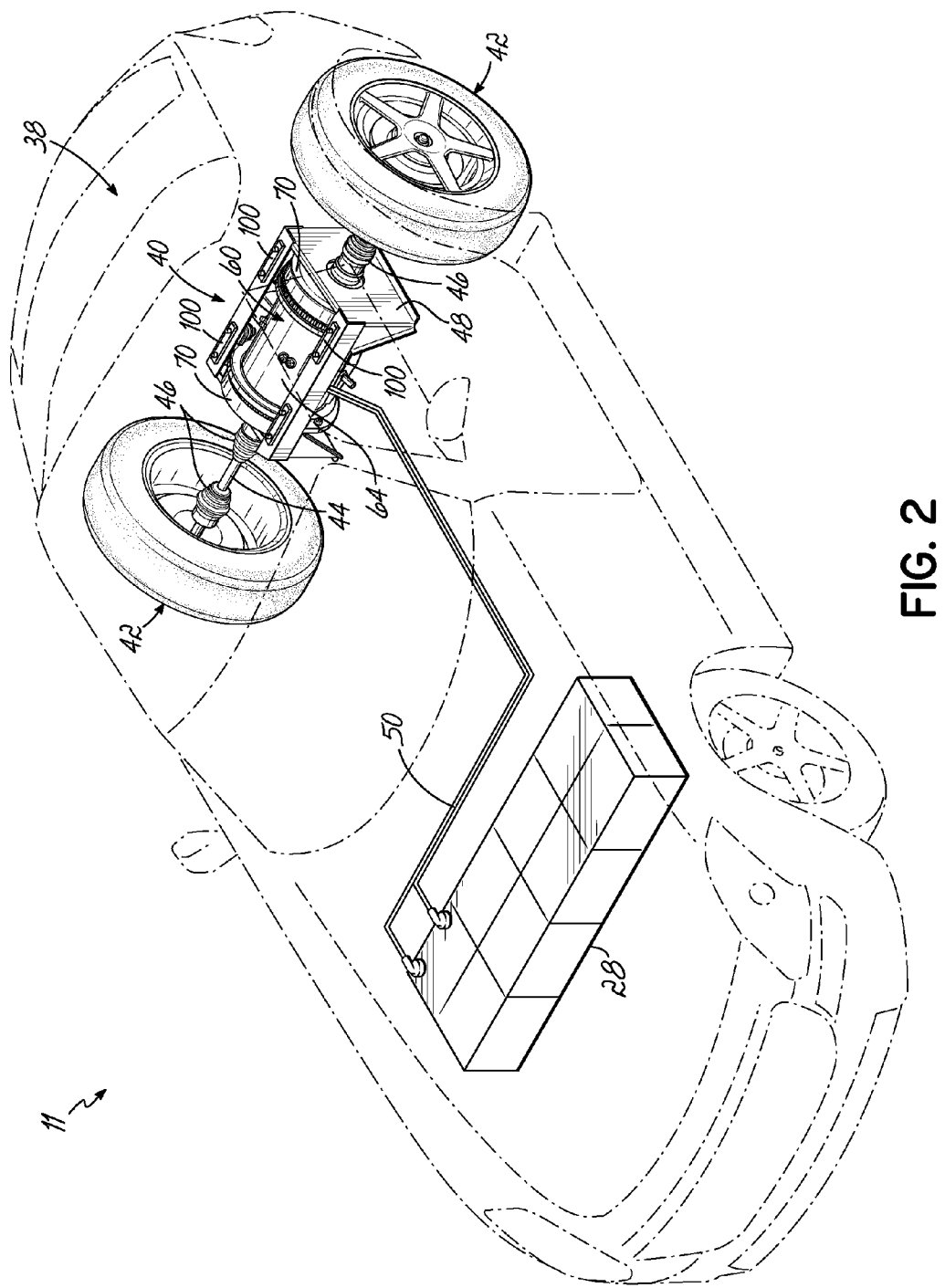
FIG. 2 is a perspective view of a vehicle having an electric motor drive assembly.
Figure 3:
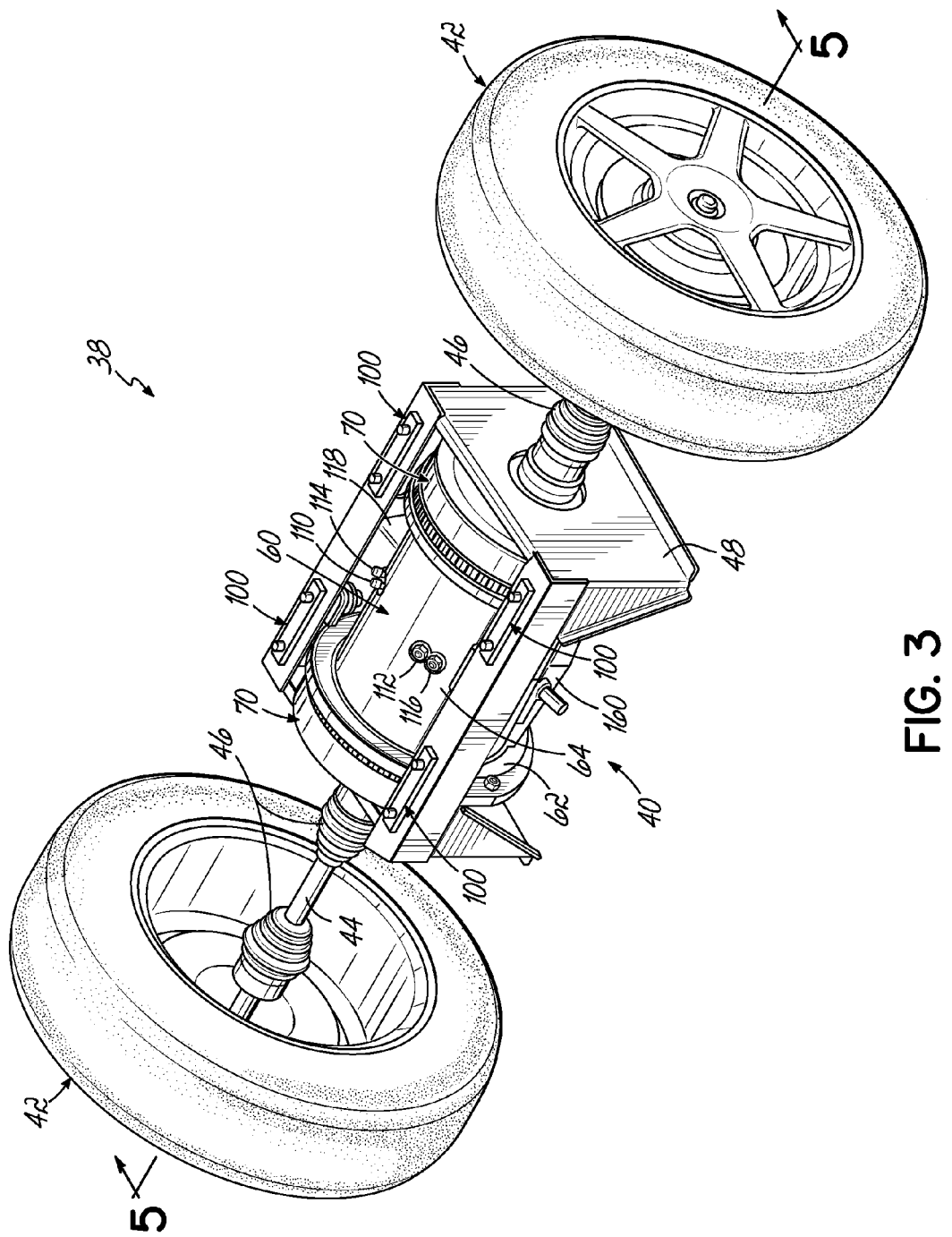
FIG. 3 is a perspective view of the electric motor drive assembly of FIG. 2.

Referring to FIGS. 2 and 3, the vehicle 11 is shown and in one embodiment is a rear-wheel drive car having an electric motor drive assembly 38. The electric motor drive assembly 38 includes the connected arrangement of the drive module 40, the rear wheel and tire assemblies 42, the axles 44, and the joints 46, which may be continuous velocity (CV) joints and may be covered by boots. In particular, the drive module 40 is operatively connected to the axles 44 through the joints 46. The axles 44, in turn, are operatively connected to the wheel and tire assemblies 42 by further joints 46. Thus, torque from the drive module 40 can be delivered to the wheel and tire assemblies 42.

The drive module 40 may be mounted to a subframe 48, which may be mounted the vehicle's frame or chassis (not shown). The drive module 40 may be connected to and receives power from the battery pack 28 through power cables 50. Of course, the electric motor drive assembly 38 can cooperate with other features commonly found in a vehicle, including a suspension system, for example. Electric motor drive assemblies for vehicles can vary, but include, generally, a drive module and components for delivering torque from the drive module to the wheel and tire assemblies. Accordingly, the electric motor drive assembly 38 shown and described is merely exemplary, and it will be appreciated that the subject matter disclosed herein could be incorporated into other electric motor drive assemblies.

The drive module 40 is a two-motor unit according to one embodiment, with each motor being operatively connected to an axle 44 for delivering torque to a wheel and tire assembly 42 through various intermediary components, the arrangement of which will now be described.

Figure 4:
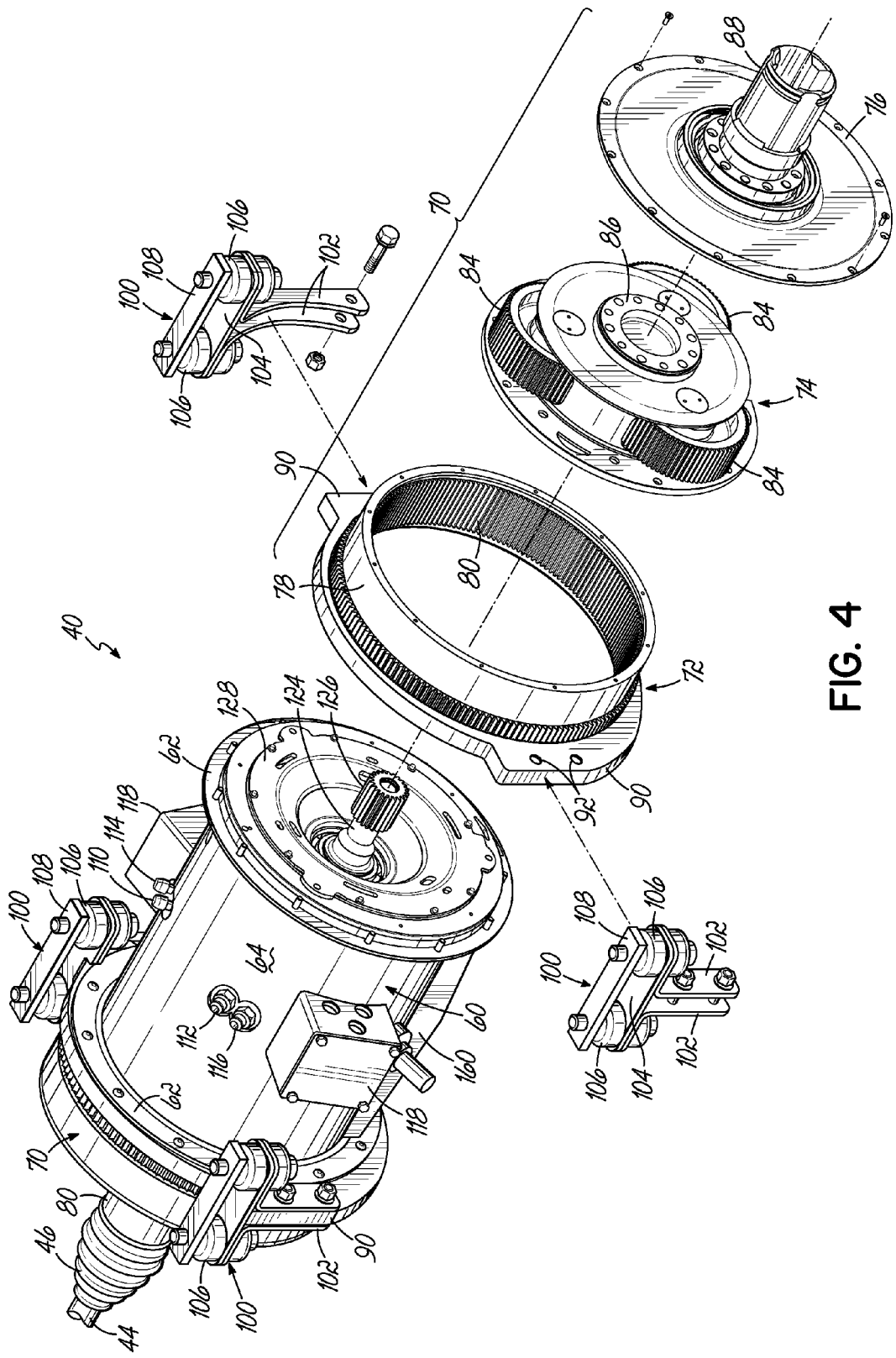
FIG. 4 is a partial disassembled perspective view showing some of the components of a drive module of the electric motor drive assembly, including the housing and the planetary gear assembly.

Referring to FIG. 4, a disassembled view showing features of the drive module 40 is presented. Because the drive module 40 is generally symmetric along a central plane in one embodiment, the description of the features on one half of the drive module 40 also serves as a description of the features on the other half.

A generally cylinder-shaped housing 60 may enclose several features of the drive module 40, including its motors and a fluid distributing manifold, which will be described further below. Housing 60 includes flanges 62 at each end, the flanges 62 extending generally radially beyond an outer wall 64 of the housing 60. The flanges 62 provide a surface for attaching a planetary gear assembly 70 to the housing 60.

The planetary gear assembly 70 serves to adjust the rotational output of the drive module's motors, and generally includes in one embodiment an outer ring element 72, a sun and planets element 74, and a cover plate 76. The outer ring element 72 is generally cylinder-shaped and includes a body 78 having a toothed outer ring 80 on a radially-interior part of the body 78. The sun and planets element 74 includes three peripherally positioned and toothed planet gears 84, which intermesh with a sun gear. As shown in the figures, the sun gear may be provided by a gear on the motor output shaft, as will be described below. The sun and planets element 74 is received in the interior portion of the body 78 of the outer ring element 72, and when it is so positioned, the teeth of each planet gear 84 intermesh with the teeth of the outer ring 80. The sun and planets element 74 further includes a hub 86 that is operatively connected to an axle hub 88 on the cover plate 76, and the two hubs 86, 88 are configured to be locked in rotation with respect to each other. The axle hub 88 is operatively connected to an axle 44 either directly or through a linkage such as a joint 46.

The body 78 of the outer ring element 72 may further include a radially-extending flange portion 90 for attaching the drive module 40 to the subframe 48. In particular, the flange portion 90 includes attachment bores 92 for attaching vibration dampening attachment brackets 100, which connect the drive module 40 to the subframe 48. Each vibration dampening attachment bracket 100 includes a pair of spaced and generally L-shaped brackets 102 connected at their upper ends by a first plate 104. Vibration dampeners 106 extend on either side of the first plate 104, the upper portions of which can contact a part of the subframe 48 when the vibration dampening brackets 100 are connected to the subframe 48 (FIG. 3). Top plates 108 provide structure for securely attaching the vibration dampening brackets 100 to the subframe 48. Also, the flange portion 90 of the outer ring element 72 is received between the spaced brackets 102, and the vibration dampening bracket 100 may be fastened to the outer ring element 72 as shown.

The housing 60 may include a first delivery port 110 and a second delivery port 112, and a first return port 114 and a second return port 116. Ports 110, 112, 114, and 116 are generally centrally disposed in an upper region of the housing 60 and provide fluid communication into the interior of the housing 60. Housing 60 may include containers 118 for housing controllers associated with the drive module's motor assemblies, which are now described Referring next to FIG. 5, housing 60 may include two substantially identical electric motor assemblies 120. Each electric motor assembly 120 includes a body 122, and a motor shaft 124 having a toothed output shaft gear 126, which may serve as the sun gear to the planet gears 84 in the sun and planets element 74. A journal 128 is provided between each motor assembly 120 and each planetary gear assembly 70, and provides structure for securing the two to each other. The teeth of the output shaft gear 126 intermesh with teeth on the planet gears 84 of the planetary gear assembly 70, so rotation of the motor shaft 124 or the toothed output shaft gear 126 causes movement in the planetary gear assembly, which is transferred to the axle hub 88, and in turn, the axle 44.

Figure 5:
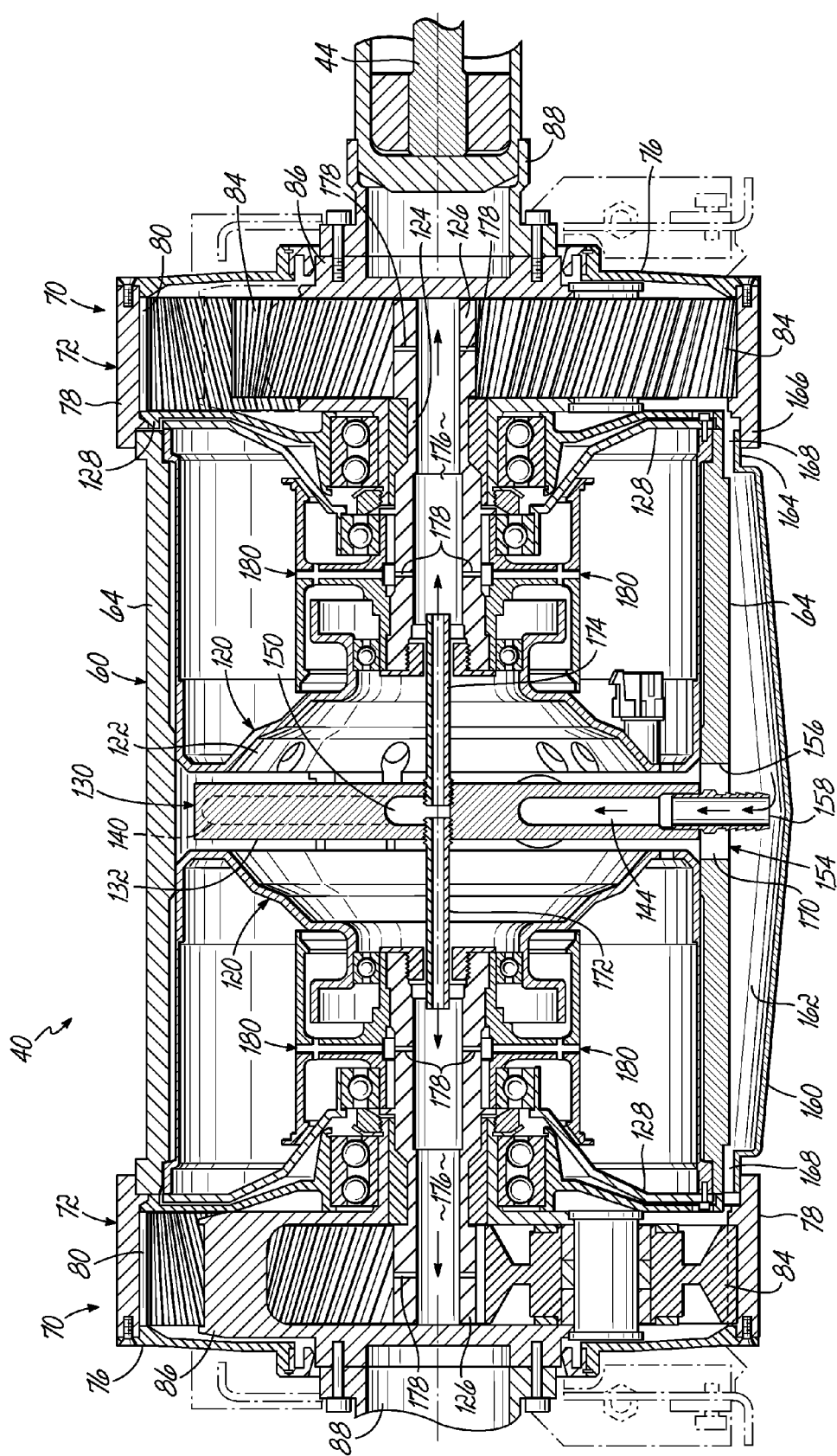
FIG. 5 is a cross section of the assembled drive module of FIG. 3, taken along line 5-5 of that figure and showing a manifold for distributing coolant fluid within the drive module according to one embodiment of this invention.
Figure 6:
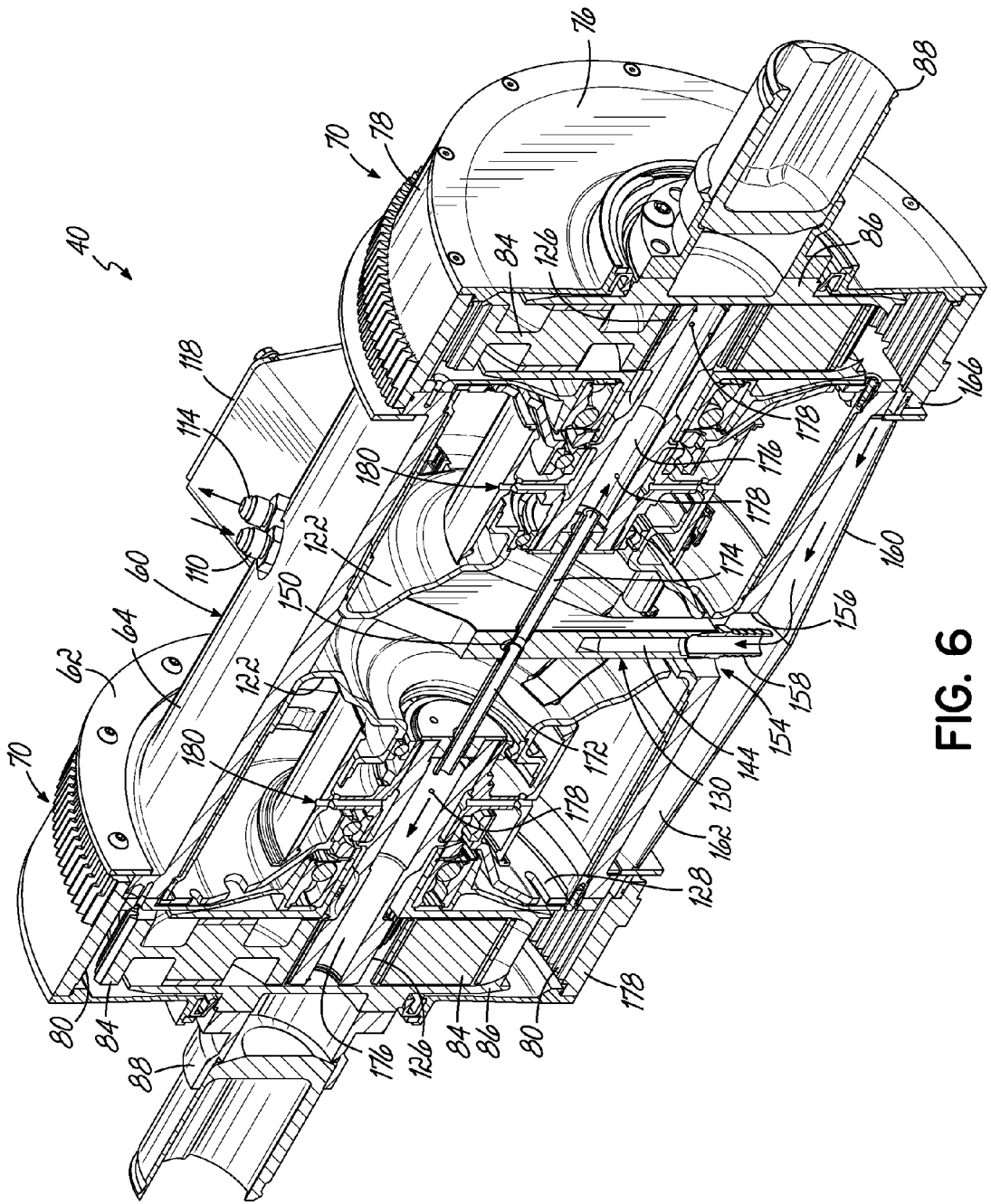
FIG. 6 is a perspective sectional view showing further features of the drive module and the Y-shaped manifold of FIG. 5.
Figure 7:
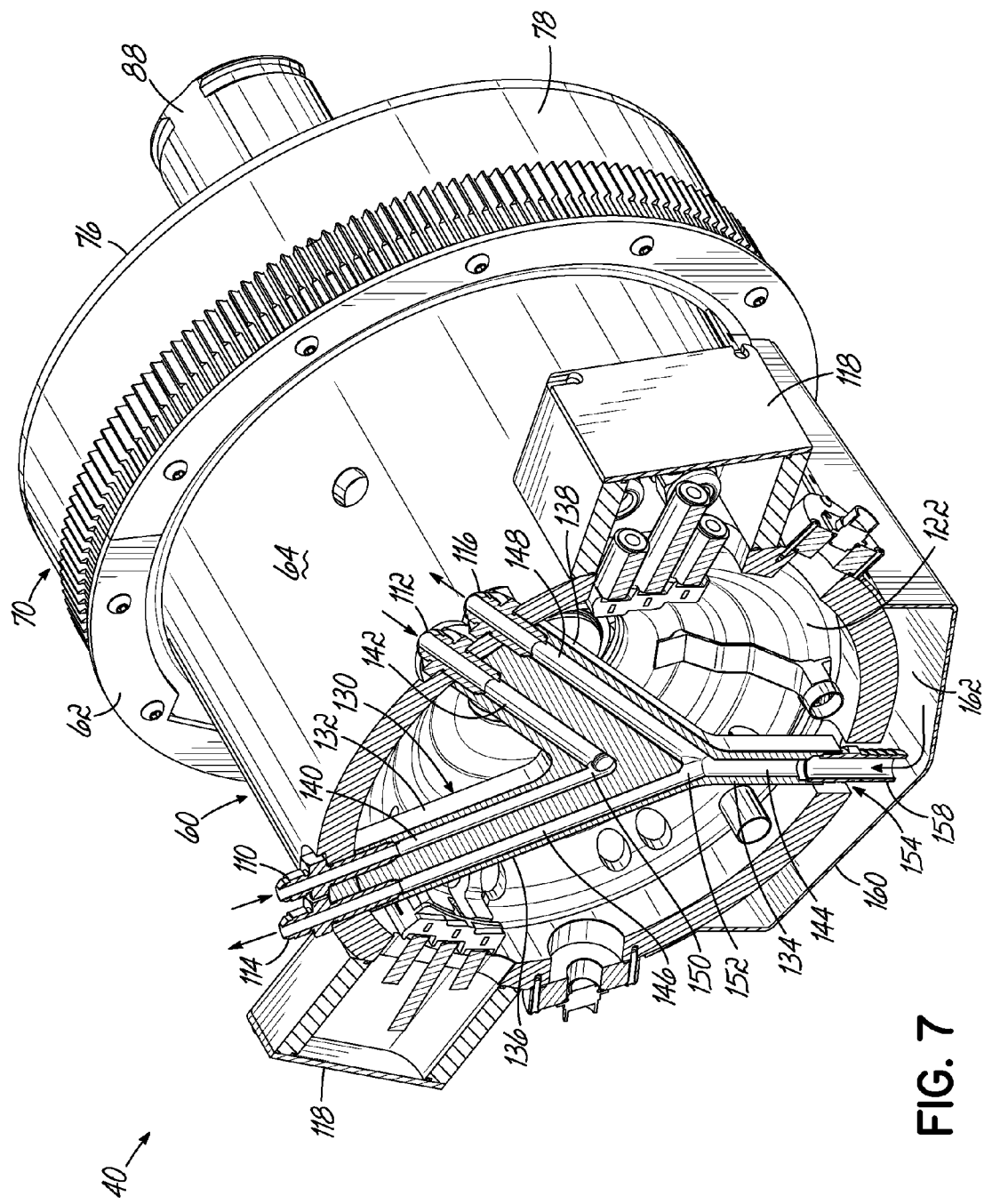
FIG. 7 is a further perspective sectional view, taken transverse to the view of FIG. 6.

Referring to FIGS. 5-7, the two motor bodies 122 are spaced apart at ends opposite the toothed output shaft gears 126 and a fluid distributing manifold 130 is situated there between in one embodiment. The manifold 130 includes several passageways that define conduits for delivering coolant fluid into and out of the housing 60. In particular, a coolant fluid, such as Automatic Transmission Fluid, may be pumped through the housing 60 for the purpose of cooling and lubricating components of the drive module 40, as will be explained more fully below.

The manifold 130 may have a substantially Y-shaped body 132 having a base 134, a first arm 136, and a second arm 138, with arms 136, 138 extending upwardly and outwardly from the base 134. The body 132 has several internal passageways that serve as conduits for the flow of coolant fluid, including a first delivery conduit 140, a second delivery conduit 142, a major return conduit 144, a first minor return conduit 146, and a second minor return conduit 148. The first delivery conduit 140 extends substantially in the first arm 136, and the second delivery conduit 142 extends substantially in the second arm 138, and the delivery conduits meet at a delivery conduit junction 150. The major return conduit 144 extends substantially in the base 134. The first minor return conduit 146 extends substantially in the first arm 136, and the second minor return conduit 148 extends substantially in the second arm 138. The return conduits 144, 146, 148 meet at a return conduit junction 152.

Structure is provided for the manifold 130, including its conduits 140, 142, 144, 146, and 148 to be in fluid communication with other structure outside the housing 60. FIG. 7 shows that the first delivery port 110 connects with the first delivery conduit 140, so that a passageway extends from the first delivery conduit 140 to outside the housing 60. Similarly, the second delivery port 112 connects with the second delivery conduit 140, the first return port 114 connects with the first minor return conduit 146, and the second return port 116 connects with the second minor return conduit 148. Thus, the ports 110, 112, 114, 116 provide structure for delivering fluid into or out of the interior of the housing 60, and in particular, into or out of the manifold 130.

The housing 60 also may include a generally centrally located drainage bore 154 defined by a bore wall 156 in a lower region of the outer wall 64. A connecting tube 158 connects at one end to the major return conduit 144 at the bottom of the base 134 and extends toward its other end through the drainage bore 154. The delivery ports 110, 112 and the delivery conduits 140, 142 may be used for delivering coolant fluid into the housing 60. Such fluid would come from a fluid source, such as a coolant fluid pump (not shown). The return ports 114, 116, connecting tube 158, and the return conduits 144, 146, and 148 may be used to return fluid within the housing 60 to outside the housing 60, where it may, for example, be put through a radiator or other heat exchanger for cooling the coolant fluid that has been heated by the components of the drive module 40 while inside the housing 60. The identification of a suitable coolant fluid, a pump for the coolant fluid, and a radiator will be evident to a skilled practitioner.

Other structures may also be provided pertaining to the distribution of coolant fluid. In a lower region, the housing 60 includes a sump pan 160 for defining a reservoir 162 for collecting coolant fluid. The sump pan 160 has its lowest point in the region below the connecting tube 158, so coolant fluid will tend to drain by gravity to this lowest position. A sump pan edge 164 is defined near the flanges 62 on the housing 60, and fits within an axially-extending lip 166 on the outer ring element 72 of the planetary gear assembly 70. An open channel 168 is defined near the sump pan edge 164 and the lip 166, and coolant fluid may flow from between the motor body 122 and the planetary gear assembly 70 into the open channel 168, which leads into the sump pan 160 and its reservoir 162. Also, there is an annular opening 170 defined in the bore 154 between the bore wall 156 and the connecting tube 158, and coolant fluid in the space between the motor bodies 122 can flow out of the housing 60 through this annular opening 170 and into the sump pan 160 and its reservoir 162.

A first coolant tube 172 and a second coolant tube 174 connect with the manifold 130 for delivering coolant fluid to the motor assemblies 120, such as by portions of coolant tubes 172, 174 that extend through the body 132 in one embodiment. In particular, the coolant tubes 172, 174 include internal passageways for the flow of coolant fluid, and are connected with the manifold 130 at the delivery conduit junction 150. Thus, the coolant tubes 172, 174 are in fluid communication with the delivery conduits 140, 142. The coolant tubes 172, 174 extend axially from the manifold 130 into passageways 176 that extend into the motor bodies 122, and into the motor shafts 124 and output shaft gears 126. Bores 178 extend radially from the passageways 176 into portions of the motor bodies 122 and the planetary gear assemblies 70, as shown. A network 180 of fluid distributing conduits is included in the motor assemblies 120 and the planetary gear assemblies 170 for the distribution of coolant fluid through these components, which allows the coolant fluid to cool the components of the drive module 40 while inside the housing 60.

Coolant fluid can be pumped into the delivery ports 110, 112, and the delivery conduits 140, 142. The coolant fluid will travel from the delivery conduits 140, 142 into the coolant tubes 172, 174, and then travel into the passageways 176 and into the bores 178 to reach the network 180. The network 180 is an open system at its ends away from the bores 178, so coolant fluid pumped into it will eventually flow out of it. The coolant fluid that travels through the network 180 will collect heat from the motor assemblies 120 and the planetary gear assemblies 70 and will ultimately flow into the reservoir 162 collecting coolant fluid in the sump pan 160. Coolant fluid from the reservoir 162 will be drawn up through the connecting tube 158 by the pressure within the system (or because of a pump) and flow out of the housing 60 by way of return conduits 144, 146, 148 and return ports 114, 116. The coolant fluid exiting the housing 60 can then be put through a radiator (not shown) to cool the coolant fluid, and then recycled back into the housing 60 by way of the delivery ports 110, 112, and the delivery conduits 140, 142.

In another embodiment not shown in the figures, the first delivery conduit 140 does not connect with the second delivery conduit 142. The first coolant tube 172 is connected to the first delivery conduit 140, but not to the second delivery conduit 142. Similarly, the second coolant tube is connected to the second delivery conduit 142, but not to the first delivery conduit 140. In yet another embodiment, either of the first minor return conduit 146 or second minor return conduit 148 could be removed so that a single return conduit extends through the body 132 of the manifold 130. In yet another embodiment, either of the first delivery conduit 140 or the second delivery conduit 142 could be removed so that a single delivery conduit extends into the body 132 of the manifold 130. In these or other embodiments, either the first arm 136 or the second arm 138 could be removed from the body 132. In addition, some of the components of the drive module 140 may be adjusted without departing from the scope of the present invention. A drive module generally includes at least one motor associated with an output element, and a housing enclosing some of the components of the drive module.

From the above disclosure of the general principles of this invention and the preceding detailed description of various embodiments, those skilled in the art will readily comprehend the various modifications to which this invention is susceptible. Therefore, we desire to be limited only by the scope of the following claims and equivalents thereof.

We claim:

1. A coolant fluid distributing manifold for a drive module in an electric motor vehicle drive assembly, the manifold comprising:
    a body, and
    passageways in the body for distributing coolant fluid to components of the drive module, the passageways defining a delivery conduit and a return conduit;
    wherein the body includes a base and an arm, and the delivery conduit extends into the arm and the return conduit extends into the arm and into the base;
    wherein the arm further comprises a first arm, and the body further comprises a second arm;
    wherein the body is substantially Y-shaped.

2. The manifold of claim 1, wherein the delivery conduit further comprises a first delivery conduit that extends into the first arm, and the body also comprises a second delivery conduit extending into the second arm.

3. The manifold of claim 2, wherein the first delivery conduit and the second delivery conduit meet at a delivery conduit junction.

4. The manifold of claim 1, wherein the return conduit further comprises a first minor return conduit and a second minor return conduit.

5. The manifold of claim 4, wherein the first minor return conduit extends in the first arm and the second minor return conduit extends in the second arm.

6. The manifold of claim 1, wherein the first minor return conduit and the second minor return conduit meet at a return conduit junction.

7. The manifold of claim 1, wherein the delivery conduit is adapted to communicate with a coolant tube for distributing coolant fluid to components of the drive module.

8. A drive module for an electric motor vehicle drive assembly, the drive module comprising:
    a generally cylindrical housing, and
    a motor at least partially enclosed by the housing,
    a coolant fluid distributing manifold having a body, and a delivery conduit and a return conduit defined in the body for distributing coolant fluid to components of the drive module,
    wherein the delivery conduit and the return conduit are in fluid communication with the exterior of the housing;
    wherein the body includes a base and an arm, and the delivery conduit extends into the arm and the return conduit extends into the arm and into the base;
    wherein the body is substantially Y-shaped and the arm is a first arm, and the body further includes a second arm,
    wherein the delivery conduit is a first delivery conduit that extends into the first arm and the body also includes a second delivery conduit extending into the second arm.

9. The drive module of claim 8, further comprising a coolant tube connected to the delivery conduit for distributing coolant to components of the drive module.

10. The drive module of claim 8, wherein the motor further comprises a first motor and the drive module further comprises a second motor separated from the first motor by a space, and the manifold is positioned within the housing in a space between the first motor and the second motor.

11. The drive module of claim 10, further comprising first and second coolant tubes,
    wherein the first coolant tube is in fluid communication with the first delivery conduit and the second coolant tube is in fluid communication with the second delivery conduit.

12. The drive module of claim 11, wherein the first and second delivery conduits meet at a delivery conduit junction.

13. The drive module of claim 12, further comprising a first delivery port in the housing in fluid communication with the first delivery conduit and a second delivery port in the housing in fluid communication with the second delivery conduit.

14. The drive module of claim 13, further comprising a return port in the housing in fluid communication with the return conduit.

15. An electric motor drive assembly having the drive module of claim 8.

* * * * *